US006240491B1

(12) United States Patent
Abily et al.

(10) Patent No.: US 6,240,491 B1
(45) Date of Patent: May 29, 2001

(54) PROCESS AND SYSTEM FOR SWITCHING BETWEEN AN UPDATE AND INVALIDATE MODE FOR EACH CACHE BLOCK

(75) Inventors: Jacques Abily, Plaisir; Jean-Jacques Pairault, Boulogne; Jean Perraudeau, Paris, all of (FR)

(73) Assignee: Bull S.A., Louveciennes (FR)

( * ) Notice: Subject to any disclaimer, the term of this patent is extended or adjusted under 35 U.S.C. 154(b) by 0 days.

(21) Appl. No.: 08/968,424

(22) Filed: Nov. 12, 1997

Related U.S. Application Data

(63) Continuation of application No. 08/397,066, filed as application No. PCT/FR94/00868 on Jul. 11, 1994, now abandoned.

(30) Foreign Application Priority Data

Jul. 15, 1993 (FR) .................................................. 93 08709

(51) Int. Cl.[7] .................................................... G06F 12/08
(52) U.S. Cl. ........................................... 711/144; 711/146
(58) Field of Search ..................................... 711/144, 141, 711/146

(56) References Cited

U.S. PATENT DOCUMENTS

| 4,445,174 | 4/1984 | Fletcher | 711/121 |
|---|---|---|---|
| 4,644,496 | 2/1987 | Andrews | 712/13 |

(List continued on next page.)

FOREIGN PATENT DOCUMENTS

| 0388032 | 2/1990 | (EP) . |
|---|---|---|
| 390538 | 10/1990 | (EP) . |
| 0434250 | 11/1990 | (EP) . |
| 0439693 | 4/1991 | (EP) . |
| 0443755 | 8/1991 | (EP) . |
| 468804 | 1/1992 | (EP) . |
| 0489556 | 6/1992 | (EP) . |
| 0507063 | 10/1992 | (EP) . |
| 61-290550 | 12/1986 | (JP) . |
| 1228035 | 9/1989 | (JP) . |
| 3172943 | 7/1991 | (JP) . |
| 3230238 | 10/1991 | (JP) . |
| 4191946 | 7/1992 | (JP) . |

OTHER PUBLICATIONS

Philipson, Lars et al. "A Communication Structure for a Multiprocessor Computer with Distributed Global Memory", 10th Annual International Conference on Computer Architecture Conference Proceedings, Jun. 13, 1993; Stockholm, Sweden, pp. 334–340.*

(List continued on next page.)

Primary Examiner—Reginald G. Bragdon
(74) Attorney, Agent, or Firm—Miles & Stockbridge P.C.; Edward J. Kondracki (57) ABSTRACT

A Process for coherent management of exchanges between memories in an information system having at least two levels of memories. The information system in one embodiment is constituted by a central subsystem which can communicate with one or more peripheral subsystems by means of input-output units. The central subsystem includes several processors linked to a central memory and to the input-output units. Each processor includes an associated cache memory linked with the central memory. In operation, each processor executes the instructions of programs contained in an associated cache memory. If the cache memory does not contain the data necessary to the associated processor, the data is read in the central memory and a copy is made using memory blocks of predetermined size. The coherent management of exchange between memories is achieved by dynamically applying a management mode selected as a function of the use that is made of each block. The management mode, either update or invalidate mode, is switched based upon a predetermined threshold of ineffectiveness for a particular mode being reached. Furthermore, soft misses can be a criteria for the ineffectiveness of the invalidation mode.

20 Claims, 3 Drawing Sheets

U.S. PATENT DOCUMENTS

| | | | |
|---|---|---|---|
| 4,755,930 | 7/1988 | Wilson, Jr. et al. | 711/122 |
| 5,055,999 | 10/1991 | Frank et al. | 711/163 |
| 5,136,500 | 8/1992 | Lemay et al. | 709/204 |
| 5,140,681 | 8/1992 | Uchiyama et al. | 711/134 |
| 5,165,018 | 11/1992 | Simor | 709/222 |
| 5,228,136 | 7/1993 | Shimizu et al. | 711/141 |
| 5,241,641 | 8/1993 | Iwasa et al. | 711/122 |
| 5,261,109 | 11/1993 | Cadambi et al. | 710/111 |
| 5,291,442 | 3/1994 | Emma et al. | 711/120 |
| 5,303,362 | 4/1994 | Butts, Jr. et al. | 711/121 |
| 5,313,609 * | 5/1994 | Baylor et al. | 711/143 |
| 5,361,342 | 11/1994 | Tone | 711/121 |
| 5,390,336 | 2/1995 | Hillis | 712/22 |
| 5,394,555 | 2/1995 | Hunter et al. | 711/148 |
| 5,437,045 | 7/1995 | Davies | 712/16 |
| 5,471,592 | 11/1995 | Gove et al. | 709/203 |
| 5,483,640 | 1/1996 | Isfeld et al. | 709/213 |
| 5,511,224 | 4/1996 | Tran et al. | 710/128 |

OTHER PUBLICATIONS

Padmanabhan, Krishnan. "Hierarchical Communication in Tube–Connected Multiprocessors", 10th International Conference on Distributed Computing Systems, May 28, 1990; Paris, France pp. 270–277.*

Eurocon 84 Computers In Communication And Control, Sep. 26, 1984, Brigton, pp. 333–337; M. Wyrzykowski, "A Homogenous Modular Operating System For . . . ".

Patent Abstracts of Japan, vol. 13, No. 153 (p–1026); Mar. 23, 1990 JP–A–02 012 361 (Fujitsu Ltd.) Jan. 17, 1990; abstract only.

IBM Technical Disclosure Bulletin, vol. 30, No. 10, Mar. 1988 New York, US, pp. 444–446, "Shared and Private Cache".

The 20th Annual International Symposium On Computer Architecture May 16, 1993, San Diego, California US Cox et al. "Adaptive Cache Coherency for Detecting Migratory Shared Data".

IBM Technical Disclosure Bulletin,. vol. 29, No. 12, May 1987, New York, US; pp. 5208–5209 "Broadcast of mostly–read–only highly shared cache lines in multi–processor systems".

Computer Architecture News vol. 17, No. 3, Jun. 1989 New York US pp. 2–15 Eggers et al "Evaluating the Performance of Four Snooping Cache Coherency Protocols".

Information Processing Society Research Report, 92–ARC–95 vol. 92, No. 64.

* cited by examiner

PROCESS AND SYSTEM FOR SWITCHING BETWEEN AN UPDATE AND INVALIDATE MODE FOR EACH CACHE BLOCK

This is a continuation of application Ser. No. 08/397,066, filed Mar. 15, 1995, now abandoned, which is a 371 of PCT/FR94/00868, filed Jul. 11, 1994.

BACKGROUND OF THE INVENTION a) Field of the Invention

The invention relates to a process for managing exchanges between electronic memories in an information system, as well as to an information system, a memory and a recording medium which implement this process. The invention applies more specifically to multiprocessor information systems with memories that are logically shared and/or physically distributed.

b) Description of Related Art

An information system is constituted by a central subsystem which can communicate with one or more peripheral subsystems by means of input-output units. The central subsystem in a large system ordinarily includes several processors linked to a central memory and to the input-output units.

The function of each processor is the execution of the instructions of the programs contained in the central memory. These instructions and the data necessary for their execution can be accessed by the processor by using the addressing means of the central memory. However, taking into account the relatively long access times in the central memory, the processors are usually equipped with a cache memory which is much faster but whose contents are limited to a certain number of extracts from the contents of the central memory. For example, the central memory is constituted by memory elements, each of which is ordinarily made from an integrated dynamic memory circuit or DRAM (Dynamic Random Access Memory) with 16 megabits, for example, which presently takes about 60 nanoseconds to access a bit, while the cache memory is currently made from a static random access memory (SRAM) which requires on the order of 10 nanoseconds to access a bit. A cache memory is composed of a data memory and a mechanism for managing the addresses of data in the memory. The data memory of a cache memory is divided into memory blocks of the same predetermined size, each of which corresponds to a quantum of exchange with the central memory. A memory block is therefore a logical entity defined by a structure which essentially comprises an address part and a part reserved for the data. Each block is therefore identified by its address, whereas the specific contents of a memory block constitute a copy of it. In other words, each block is made up of one or more copies. A cache memory can be an associative type with a single level, better known as "direct mapped cache memory" or an associative type with several levels. In a cache memory, the mechanism for managing addresses is currently called a directory or "cache tags."

A processor is composed of various processing circuits. An example of a description of these circuits adapted to a microprogrammed processor will be found in the Applicant's patent application EP-A-0434483 (corresponding to U.S. Pat. No. 5,408,623). In this document, the processors are connected by means of their cache memory to a bus which allows them to communicate with the central memory. Each processor and its cache memory resides together on the same printed circuit board which links several integrated circuit packages. Today, the ever-increasing scale of integration makes it possible to integrate each processor in a chip and to associate it with at least one part of the cache memory.

Current advanced information systems interpose other memory levels between the memory and the cache memory of the processor. For example, an intermediate cache memory is used as described in the above-mentioned patent. In this patent, the cache memories near the processors communicate with the central memory through an intermediate cache memory. The cache memories near the processors are therefore called private cache memories and they share the intermediate cache memory, which is therefore called a shared cache memory. A private cache memory is also composed of a data memory and an address management mechanism. More generally, a more or less complex hierarchy can exist between the memories which link a processor to a central memory. In this hierarchy, it is said that the level is higher when it is nearer to the processor. On the other hand, the central memory, which constitutes the lowest level, can also be shared and its elements can be distributed in the information system. The invention generally applies to the management of exchanges between two levels of any hierarchy of electronic memories in an information system.

SUMMARY OF THE INVENTION

The invention relates to the problem posed by the coherence of the management of these exchanges. The problem is linked to the fact that a copy of a memory block requested by a processor can be modified by the processor, thus no longer corresponding to the copy stored in a cache memory that is normally available to other processors.

The current solution consists of using one of two opposite strategies for managing exchanges, one of which is carried out in an update mode, the other in an invalidation mode. When a copy of a block has been modified by a first processor, this copy becomes the reference copy, and the invalidation consists of invalidating all the other copies of the block that have not been updated. Invalidation is a simple strategy, because it reduces the number of copies to manage, thus reducing traffic. The execution is also simple, since it is done by modifying a status bit in the directory. The invalidation is terminated when an acknowledgement message is received by the cache memory which possesses the reference copy. The acknowledgement can be implicit, in the construction of the machine for example, or it can take place after a predetermined period of time. However, when a second processor requests a copy of the block, its cache memory must search for the reference copy in the cache memory of the first processor. What follows is a reduction in the hit ratio of the second processor's access to its cache memory, and a slowing of its processing speed. Updating all the existing copies of a block offers the advantage of making them available to the other processors and thus avoids the necessity of the processor requesting a copy of this block having to search for the reference copy at the level of another processor. But updating necessitates sending more voluminous messages to all the memories which have a copy of the block and the acknowledgement that they all have the good copy. These messages obstruct traffic between the memories considerably, and thus slow down the mean access of a processor to a block copy that is not directly available. This disadvantage is aggravated by the fact that not all the updated copies are used.

In the prior art, the management mode is predetermined and it applies to the entire set of blocks contained in the memories, or to a subset such as a memory page. For example, the software can be designed so that it decides to use updating when the page is shared intimately among several processors, and invalidation when it is not shared or shared very little. Once the mode for a page has been chosen, the software uses it from the beginning to the end of the execution of the program on this page. This mode applies to all the blocks in the page, and it generally applies during the entire execution of a program. The two modes therefore represent static strategies which are easy to use. The mode chosen is used in the control circuit of each of the memories. The advantage of using static modes also resides in the physical simplicity of their means of implementation in the control circuit of each of the memories. However, the mode chosen can only be adapted to one phase of the program and to a limited number of blocks in one page. If the software developer wishes to adapt the mode to each phase of a program, this necessarily complicates his program considerably.

The invention solves the problem posed by the coherence of the management of the exchanges between the memories in an information system by dynamically applying to each block the management mode that is best adapted to the use that is made of it. The invention thus applies to each block and it consists of making a management choice for each block in accordance with a mode which is no longer static, but which is dynamically evolving as a function of the use that is made of the block.

European patent disclosure EP-A-0443755 corresponding to U.S. Pat. No. 5,241,644 describes a process for coherent management of the exchanges between the cache memories in an information system, which consists of switching between an update mode and an invalidation mode for the copies of memory blocks as a function of a threshold which represents the ineffectiveness of the mode used for each of the blocks. However, this process is based on the technology so-called "snoopy" cache memories. This technology is based on the use of a shared bus by all of the cache memories, which thus can see all the messages which transit through this bus and take in the messages which concern them, hence the word "snoopy." The use of the shared bus means that all the memories which share it are informed in each of the coherence exchanges. The result is that each cache memory sees these exchanges take place and can make an individual decision as to the choice of management mode, independent of the other cache memories and in a decentralized manner (independently from the memories at the lowest level). This is well known to one skilled in the art, and it is made quite clear in the description in the aforementioned disclosure. A variant of this process is also described in an article by Eggers et al. in *Computer Architecture Conference Proceedings,* Vol. 17, No. 3, June 1989, Washington, USA, pages 2–15: "Evaluating the performance of four snooping cache coherency protocols."

The subject of the invention is a process for coherent management of exchanges between a given number of memories in an information system, which consists of switching between an update mode and an invalidation mode for the copies of memory blocks as a function of a threshold which represents the ineffectiveness of the mode used for each of the blocks, characterized in that the number of memories informed in each of the coherence exchanges is, on average, less than the given number.

This definition of the characteristic means simply that this process does not apply to systems which use a shared bus ("snoopy" technology) in which all the memories are informed in each of the coherence exchanges. Various examples illustrate the process according to the invention.

Another subject of the invention is an information system which comprises a hierarchy of memories and means for coherent management of the exchanges between the memories by switching between an update mode and an invalidation mode for the copies of memory blocks, characterized in that the management means implement the process according to the invention.

A corollary subject of the invention is a memory which includes a data memory for storing copies of memory blocks, and a control circuit, characterized in that the control circuit includes a hardwired algorithm for the implementation of the process according to the invention.

In other words, the invention offers the advantage of being implemented in the form of a simple algorithm hardwired into the hardware of a memory, which allows the dynamic adaptation of the management of the blocks in the memory to the observed performance of these blocks during their use.

BRIEF DESCRIPTION OF THE DRAWINGS

The invention is revealed in the description which follows, given by way of example and made in conjunction with the appended drawings.

In the drawings.

DESCRIPTION OF THE PREFERRED EMBODIMENTS

Figure 1:
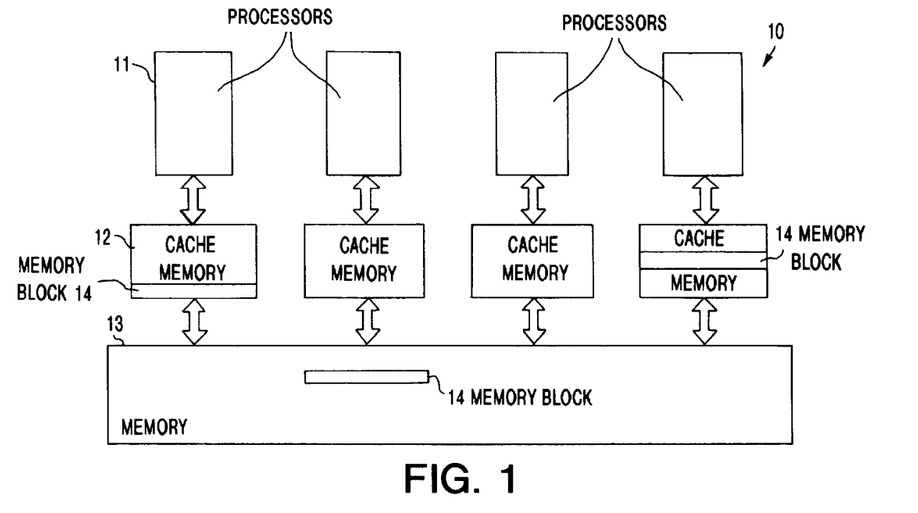
FIG. 1 is a partial block diagram of an information system for implementing the process for coherent management according to the invention, taken as an example.
Figure 2:
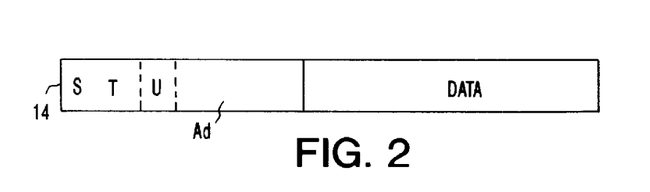
FIG. 2 is a schematic view of a copy of a memory block which can be used for the implementation of the invention.

In the information system 10 represented in FIG. 1, four processors 11 equipped with their respective cache memories 12 are linked with a memory 13. In operation, the data necessary to each processor 11 are requested from the associated cache memory 12. If the cache memory does not contain such data, the processor reads the data in the memory 13 in order to make a copy by using memory blocks 14 of predetermined size. The structure of a copy 14 of a memory block is illustrated in FIG. 2 and conventionally comprises an address part Ad and a part reserved for the data D.

The process for managing exchanges between the memories 12 and 13 of the information system consists of using the update mode or the invalidation mode for the copies of a memory block. If invalidation is chosen, it is known, for example, to include in the address Ad of each block 14 two bits ST which represent the state, or status, of the block. Conventionally, four fundamental states are distinguished, which are standardized under the MESI code. In this code, the modified state M corresponds to the case in which a cache memory is the only holder of a modified copy of a block, called a reference copy, and in which the other copies that are available in the system are not updated. In this case, the cache memory holding the copy having the state M is responsible for providing and updating the memory if it wishes to relieve itself of this copy. A copy having the exclusive state E is also the reference copy held by a cache memory, but in this case the central memory has an updated copy of it. The shared state S designates a copy having several holders, potentially including the central memory. The potential holders may depend on the management strategy adopted. Finally, there is the invalid copy state I when the corresponding memory has a copy of the block which has not been updated and therefore does not hold the reference copy. Still other optional standardized states exist, such as the modified shared state which is assigned to a reference copy, which has identical copies in other cache memories, but not in the central memory. This case arises in the update mode for the copies in the cache memories, with the exception of that held by the central memory. In this case, the updated copies have the shared state S and the cache memory which holds the reference copy, generally marked M, has the responsibility for updating the other cache memories and, potentially, the central memory. This case makes it clear that the update can be partial, for example limited to the private cache memories that are connected to the same shared cache memory. The invalidation therefore consists solely of modifying the state of the two bits which represent the state of the copies other than the reference copy.

Figure 3:
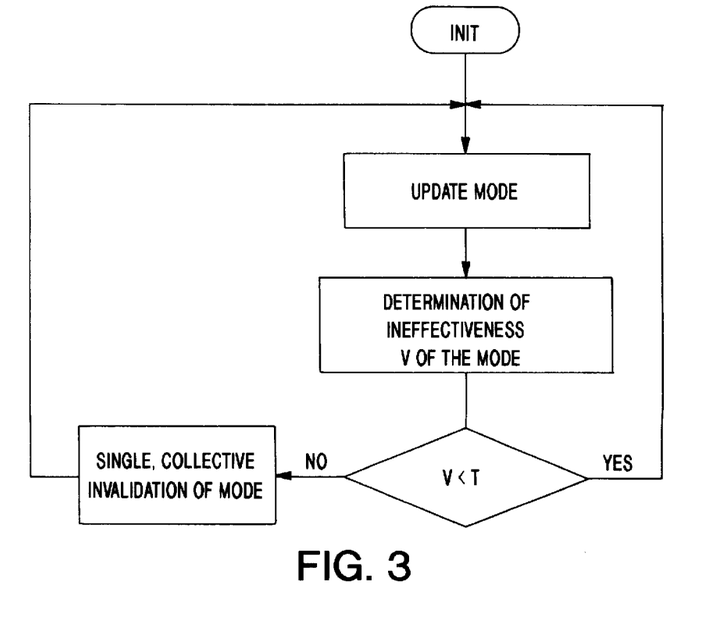
FIG. 3 is a diagram illustrating a first example of implementation of the process according to the invention.

The invention is based on a process which consists of determining at least one threshold T which represents the ineffectiveness V of the mode used, and of using the second mode when the threshold T is reached. FIGS. 2 and 3 illustrate a first example of implementation of the process of the invention.

In the diagram in FIG. 3, the update mode is chosen as the initial management mode. The ineffectiveness V is determined, then compared to the threshold T. As long as the ineffectiveness V remains lower than the threshold T, the update continues. Otherwise, invalidation becomes the management mode. In the example represented in FIG. 3, when the threshold T is reached, the management process consists of performing a single global invalidation of each non-update copy of the same memory block and then returning to the update mode. The single global invalidation deletes all the non-updated copies of the same block which have been deemed to be unusable or rarely used. An improved but more complex option could delete only the unusable ones. It is generally understood that this invalidation can affect just a selective portion of the copies of a block in the system, rather than the entire set, for example by invalidating only the copies deemed unusable for a processor or for other criteria. The invalidation thus makes it possible to use updating sparingly during subsequent modifications of the remaining or restored valid copies and thus to return to a state that is favorable to updating. Generally, this example of a management process consists of performing a single collective invalidation of all the non-updated copies of the related memory block when a threshold indicating the effectiveness of the update is reached, then returning to the update mode. The collective invalidation can be global or selective. Global invalidation is the easiest to implement.

FIG. 2 illustrates an example of a structure of a copy of block 14 used to determine the ineffectiveness of a management mode in the process according to the invention. In the address Ad, the copy of the memory block 14 illustrated includes, besides the two status bits ST, a utility bit U. The utility bit U is set, for example, at a first state (0 for example) when a first copy is supplied or during an update, and at a second state (1) during a reading of the copy. Consequently, if for example a processor 11 reads in its cache memory 12 a copy of block 14, the utility bit U is set at the second state 1 if it was at the first state 0; otherwise it is maintained at the second state 1. If subsequently the processor modifies the data in a copy of block 14, the status bits ST will be changed to indicate the modified state M of the copy, and the choice remains to leave the utility bit U unchanged in state 0 or to set it at the first state 0 if it was at the second state 1. The global or partial update of the other copies sets their utility bit U at the first state 0. The first state 0 of the utility bit U thus truly represents the ineffectiveness of the update of the corresponding copy of the block, whereas on the contrary, the second state represents the effectiveness, indeed even the necessity, of the update. More generally, the utility bit U incorporated in a copy represents the use of this copy, so that the utility bits of the copies of a block represents the effectiveness of the mode for managing the copies.

The ineffectiveness V of the update and the ineffectiveness threshold T can be determined in accordance with various criteria. The physical criteria are distinguished from the temporal criteria which, in practice, are combined with and adapted to one another. As examples of physical criteria, the threshold can be simply an absolute number of the copies of the block, whose utility bits U are in the first state, a percentage of the existing copies of the block, or a percentage of a predetermined number of copies for each of the blocks, for example the maximum number of copies which a block in the system can have. The determination can also be made as a function of the number of blocks at the level of the cache memories 12, or as a function of the foreseeable degree of sharing of the copies among the various processors 11. Preferably, the management mode will not be modified in consideration of the ineffectiveness of an update of a single copy, but rather in consideration of the ineffectiveness of a total update or an update of a significant portion of the entire set of copies of a block.

The temporal criteria make it possible to decide on the moment at which the ineffectiveness of a mode is to be determined. For example, if the current mode is the update mode, the ineffectiveness can be determined at each new update, thereby taking advantage of the acknowledgement to retrieve the pieces of information which relate to the utility bits of the updated copies. It is also understood that these pieces of information could be stored in the control circuit of the related memory 12 or 13 and, after a given number of updates, could determine the ineffectiveness of the mode used from all of the pieces of stored information and from the physical criteria adapted to this case. For example, it would suffice to know if, from among a given number of updates, a number or a percentage of these updates has been useful in determining the ineffectiveness of the update. Another temporal criterion can consist of determining the ineffectiveness of a mode at predetermined time intervals, which may or may not be dependent on events in the operation of the system or the management mode. For example, a cyclical analysis of the ineffectiveness of the update can be performed, and if one copy 14 has been usable, the update mode can remain. However, it is often preferable to evaluate the ineffectiveness of a mode on the copies of a block when operations have been carried out on this block, and not independently from these operations, since the frequency of use of the blocks varies greatly depending on the blocks. The invention offers the advantage of dynamically adapting the management mode to the frequency of use of each block. For example, the evaluation of the effectiveness or the ineffectiveness of a mode and the determination of the appropriate mode can advantageously be made with regard to an exchange between two memories.

The threshold T is preferably stored in each of the memories 12 and 13 of the system 10, for example in their control circuit. Likewise, the effectiveness or ineffectiveness will advantageously be determined according to a hardwired algorithm in the control circuit of each of the memories. It is also clear that the ineffectiveness of a mode can be determined in a way other than by incorporating a utility bit U in each copy of block 14. The bit U has the advantage of being a simple means for determining whether or not a copy is usable, and of being able to be utilized by the same processing means used for the status bits ST of a copy of block 14. The utility bit U can be considered as a status bit, similar to the status bits ST, so that its states could be integrated with them. Moreover, even if the determination of the ineffectiveness of a mode is made from a utility bit U, its incorporation into each copy of block 14 is not necessary. For example, the utility bit U can be located in just one copy of each block, preferably in the memory 13 or in a shared cache memory in a hierarchy with at least three levels of memories. This would compel each cache memory to inform the memory 13 of each update by means of notification messages which refer to a copy of the block, which are advantageously asynchronous. It is understood that the utility bit U can therefore be replaced by other more improved and more precise means for determining the ineffectiveness V of the mode or, on the contrary, its usefulness. If a utility bit U is used, it can generally be incorporated into at least one copy of block 14 or in the entire set of copies of each block.

Figure 4:
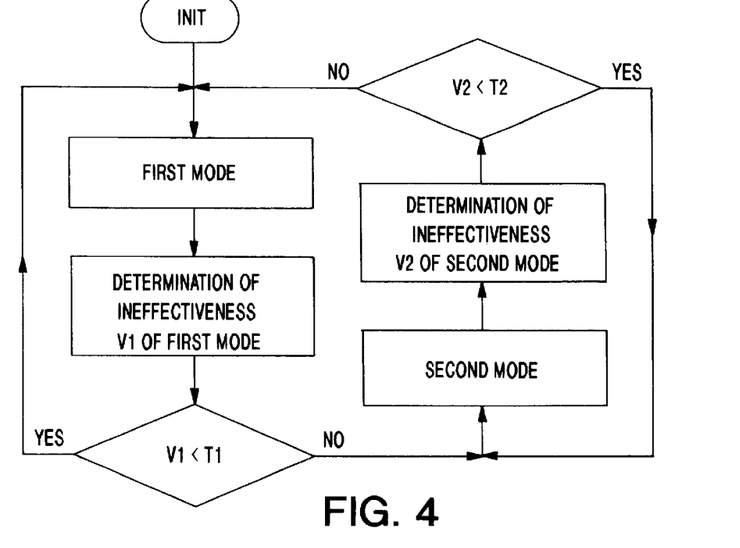
FIG. 4 is a diagram illustrating a second example of implementation of the process illustrated in FIG. 2.

The diagram in FIG. 4 illustrates a second example of implementation of the process of the invention. During the initialization of the system, a first management mode is selected by the software in the system. The ineffectiveness V1 of this first mode is determined, then compared with a first usefulness threshold T1. The first mode proceeds if it proves to be effective (V1<T1). Otherwise, the management process is carried out in the second mode. The ineffectiveness V2 of the second mode is determined, then compared to a second usefulness threshold T2. The second mode continues, if it proves to be useful (V2<T2); otherwise the management process reverts to the first mode if the second mode is no longer useful (V2=T2). This process can be implemented in a manner similar to that which relates to the examples in FIGS. 2 and 3. It is noteworthy that the invalidation normally used in the example in FIG. 4 is no longer performed in the same manner as that described in reference to FIGS. 2 and 3. In the example in FIG. 4, the invalidation is that which is ordinarily used as an alternative to updating. Preferably, this mode will be chosen as the initial mode, since with updating being costly, one seeks to limit its use when that proves beneficial.

Figure 5:
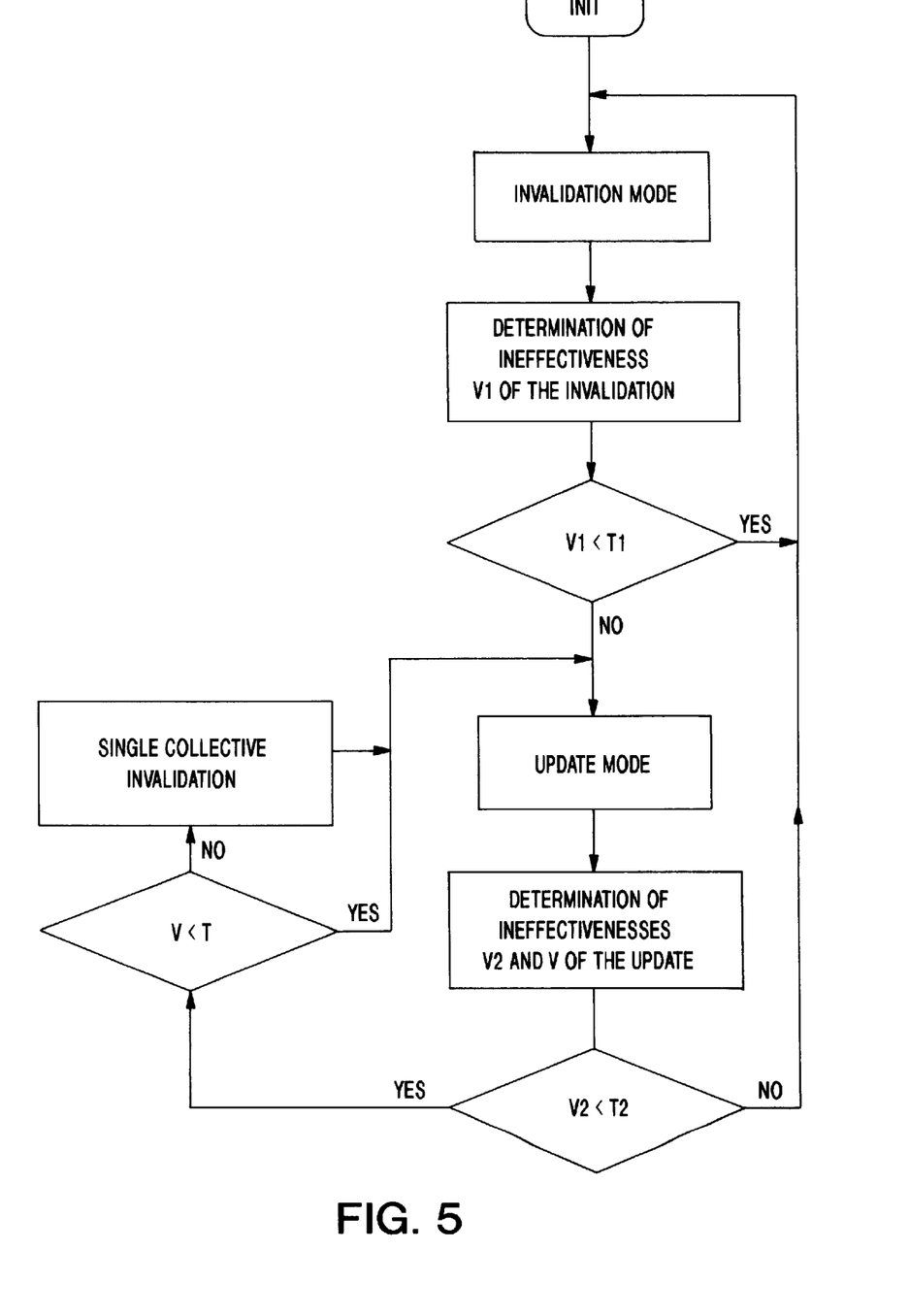
FIG. 5 is a diagram illustrating a first variant of implementation of the second example of the process illustrated in FIG. 4.

The diagram in FIG. 5 illustrates an example of a variant of implementation of the process which combines the examples described in conjunction with FIGS. 3 and 4. According to this variant, the management process is initially set in the invalidation mode. As in the process represented in FIG. 3, the ineffectiveness V1 of the invalidation is determined, then compared with the threshold T1. If the invalidation is effective (V1<T1), this mode is maintained. Otherwise, the mode becomes the update mode. The ineffectiveness of the update is determined in two different ways as a function of different criteria. First, an ineffectiveness V2 and a threshold T2 are determined as a function of criteria for the counter-productivity of the update. In other words, these criteria reveal that the update is ineffective because it is not adapted to the current situation. Therefore, as illustrated in FIG. 5, if the ineffectiveness V2 is greater than the threshold T2, the management mode returns to invalidation. In the opposite case, an ineffectiveness V and a threshold T are determined so as to reveal that the update mode can remain the best adapted mode if useless updates are deleted. In this sense, the ineffectiveness V and the threshold T are the same types as those presented in conjunction with FIG. 3. Thus, a single collective invalidation of all the copies of the memory block is enough for the update to continue effectively. Generally, the ineffectiveness V and the threshold T can be determined in a manner that may or may not be different from V2 and T2. For example, an update of the six available copies of a block can be considered to be a mode that is well adapted to the management of these copies if at least two copies have been read. The ineffectiveness threshold T2 for the non-adaptation of the update can be zero copies read. In this case, V2=T2, the management mode returns to ordinary invalidation. The ineffectiveness threshold T can be a single copy read, meaning that the update has worked, but that it is cumbersome to manage. If such is the case, V=T, the other copies of the block are invalidated all at once, either globally or selectively, and the mode returns to the update mode.

Figure 6:
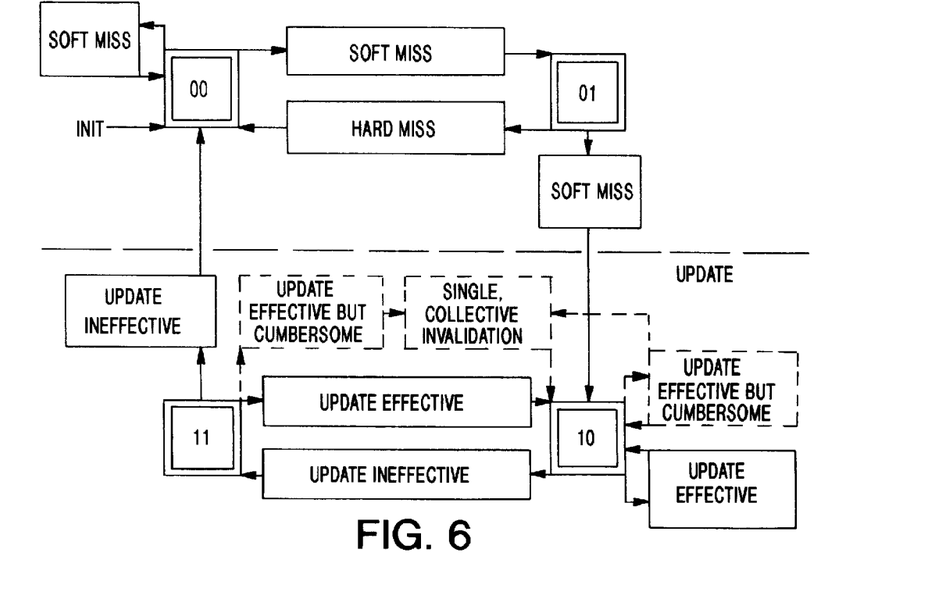
FIG. 6 is a diagram illustrating a second variant of implementation of the second example of the process illustrated in FIG. 4.
Figure 7:
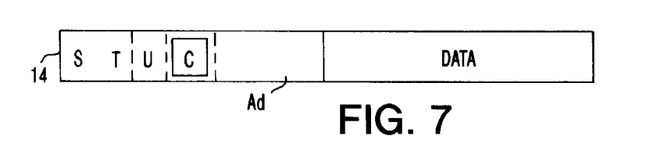
FIG. 7 is a schematic view of a memory block used for the implementation of the variant of the process illustrated in FIG. 6.

The diagram in FIG. 6 illustrates another variant of the process represented in FIG. 4. The variant in FIG. 6 is based on a distinction between two states of miss to read a cache memory. In the first state of miss, the copy 14 of the memory block requested is not there and its request ends in a miss which will be called a hard failure. In the second state of miss, the copy of the memory block having the requested address AD is in the cache memory, but its reading has been invalidated as being a non-updated copy. The request for the copy into the cache also ends in a miss, which will be called a soft miss. On the other hand, the variant of the process illustrated in FIG. 6 is implemented by using each copy of block 14 which has, for example, the structure represented in FIG. 7. This structure is that of FIG. 2 and in the address field Ad it incorporates, in addition to the status bits ST and the utility bit U, a code C, which in the preferred example has two bits.

In order to describe the process illustrated in FIG. 6, it will be assumed, when a memory block 14 of the memory 13 has not yet been copied into the cache, that the two bits in the code C are at zero and that the current mode is the invalidation mode. If a processor 11 encounters a hard miss while reading its cache memory 12, the cache memory makes a copy of the block 14 in the memory 13 and the mode remains unchanged by the invalidation mode. If the copy of the block is used very little, the cache memory 12 will later effect a replacement of the copy of the block with that of another block. Consequently, if subsequently the same processor 11 re-requests the preceding copy, it will again encounter a hard miss. Invalidation is therefore truly the mode adapted to this case.

Now let it be assumed that a processor 11 reading its cache memory 12 finds the copy 14 which was searched for, but in which the data D have been invalidated. This event corresponds to a soft miss and indicates that an update could have avoided this miss and improved the performance of the system 10. In other words, it would have been the mode that was best adapted to the present situation. This event could serve directly as a threshold for changing the management mode to the update mode. However, in order to assure greater stability of the process, the threshold is delayed by an effective triggering condition which, if it is not verified, maintains the current management mode, which in this case is invalidation. In the example illustrated, the code C is changed to the state 01, which means that the threshold has been reached and that it is waiting for an effective triggering condition to be established in order to change the mode. It will be said that the threshold is conditional and that the mode is therefore transitory. If a soft miss occurs again in the same block, in the same cache memory or in another cache memory 12, this event constitutes the condition for triggering the threshold and confirms that the update mode was the best adapted mode. The management mode then becomes the update mode. In the example illustrated, the code C is changed to the state 10 in order to indicate that the mode is the update mode. On the other hand, if in a state of the code C=01, a hard miss occurs, this event indicates that invalidation is truly the mode which is appropriate, so that the invalidation mode is maintained. In the example illustrated, the code C returns to its state 00 of firm invalidation.

Let it now be assumed that the system 10 is operating in an update mode which corresponds to the code C=10. Subsequent modifications of one or more copies 14 of each memory block by one of the processors 11 will therefore be followed by updates in the cache memories 12, and the readings performed by the processors 11 will be successes and not misses. In this situation, the question which then arises is whether the update remains useful. The misses which can occur from the processors 11 requesting the information for the first time are no longer taken into account, and it is therefore possible to determine at least one threshold which represents the usefulness of the update mode, particularly according to the usefulness criteria which have been described in relation to FIGS. 2 through 5. For example, at each update of a copy 14 of a memory block in a cache memory 12, the cache memory analyses the state of the entire set of utility bits U of the block in accordance with the examples described above. If the update is deemed useful, the value of the code C is maintained at 10, as illustrated in FIG. 6 by the loop which incorporates this code value. In this variant, the update threshold is conditional. If the threshold is reached, the change of mode is delayed by a condition. For example, the measurement of the ineffectiveness V of the mode can serve as a condition, so that if the evolution of this measurement confirms the ineffectiveness of the mode, this condition will be replaced.

In the example illustrated, if the update is deemed ineffective, the value of the code C is modified in 11 to indicate a transitory update. In other words, instead of changing modes, the update mode is maintained in a transitory state which assures greater stability of the process and avoids having the process "oscillate" between updating and ordinary invalidation.

Now let it be assumed that the update mode is in its transitory state which corresponds to the code C=11. If at the next update the utility bits have evolved to indicate an effective update, the code C is returned to the value 10, which corresponds to the firm update mode. If on the contrary the next update is still deemed ineffective, the management mode becomes invalidation and the code C takes on the value 00. Thus the initial situation described above exists once again.

It is clear that the initial mode chosen by the system can be the update mode. It can also be one of the transitory states, which would allow the system to establish itself quickly in the best adapted mode. The transitory states described are brief and can be prolonged. It is necessary, however, to make sure that the strategy does not become too complex and does not overly complicate the operation of all the memories, which would in turn cause a wait in the management of exchanges between the memories. Likewise, it is clear that one or both transitory states can be omitted. For example, the transitory update with the code C=11 could be omitted. As for the invalidation mode, it is possible to pass into the transitory mode after a given number of soft misses and to return to the firm mode after a given number of hard misses. The same is true for the passage from the transitory mode into the update mode. This process can be supplemented by being combined with that in FIG. 3. FIG. 6 illustrates an example of this combination using dashed lines. If in the update mode the code is 10 and the update is deemed effective (V2<T2 in FIG. 4), the update mode is maintained. If it us deemed effective but too cumbersome to manage (V<T in FIG. 3), a single collective invalidation is performed and the mode returns to the update mode. If the update is ineffective (V2>T2), the update becomes transitory and the code is set at 11. If the update is then deemed effective (V2<T2), the update continues and the code again becomes 10. If it is deemed effective but too cumbersome (V<T), a single collective invalidation is performed and the mode again becomes the update mode with the code 10.

In the 2-bit code C that has been described, the states of the first bit represent the two modes and the states of the second bit represent the two transitory modes. More generally, the code C could be limited to one bit in which, for example, the states would represent the two modes, or one mode and its transitory mode. It is understood that the process could also use another code C than that described. Likewise, although the code C is incorporated into each copy 14, it is possible for it to be resident in the memory 13 only. This case would also be noteworthy, since the code C relates to all the copies of a block. More generally, the code C will preferably be placed wherever the decisions of the management mode take place. It will be seen later herein that these decisions can also be made in the cache memories. To sum up, it can generally be said that the process of the invention optionally consists of incorporating in at least one copy of a block at least one bit of a code C which represents at least one mode, a mode which can also be a transitory mode. The bit U can be incorporated into the copies contained in the cache memories 12 and not in the memory 13, or in the entire set of copies contained in the memories 12 and 13, or in a selected number of copies which is at least equal to 1, for example the copies connected to a given group of processors. In the case in which the code C is always associated with the bit U, it is also understood that both of them can be combined in a more compact or higher-performance format. The preceding description also reveals that the code C, just like the utility bit U, could be replaced by another means, software and/or hardware, which would represent at least the transitory modes.

More generally, the preceding description clearly reveals that the process of the invention for managing exchanges between the memories of an information system conventionally includes the use of an update mode or an invalidation mode for the copies of a memory block. But the invention is distinguished from the prior art in that it consists of determining a threshold which represents the ineffectiveness of the mode used, and of utilizing a second mode when the threshold is reached. It has been seen in conjunction with FIG. 3 that the threshold can be a value, a number or a percentage, for example, and that this value can be defined by physical and temporal criteria. In the example illustrated in FIG. 3, the process consists of incorporating into each copy of a memory block a utility bit U whose states represent the use of the corresponding copy. However, it has been seen more generally that it is possible to incorporate a utility bit into at least one copy of a memory block. On the other hand, in the example illustrated, the ineffectiveness criteria are based on the use of the states of the utility bit. It is clear that other criteria which are independent of a utility bit can be used. It has also been seen in conjunction with FIG. 6 that if the mode used is the invalidation mode, the process consists of distinguishing, among the misses to read a memory, between the hard misses, which correspond to the absence of the copy of the block sought, and the soft misses, which correspond to the presence of such a copy which however is invalidated, and of considering the soft misses as criteria for the ineffectiveness of the invalidation. In other words, the threshold can be directly defined by one or more soft misses, or by a value which involves the soft misses as ineffectiveness criteria, among other criteria and/or as a triggering condition. Events other than soft misses can serve as additional or substitute criteria.

The first example represented in FIGS. 2 and 3 has made it apparent that if the mode used is the update mode, the process consists of using the threshold T which indicates that the mode is effective but too cumbersome to manage, and of using a single collective invalidation of copies of a block when the threshold T is reached, then returning to the update mode. The collective invalidation of copies indicates that it can be global or can select at least one copy of the block. On the other hand, the single invalidation can be performed in several phases. The second example represented in FIGS. 4 through 7 uses the invalidation that is ordinarily utilized in information systems. This second example has also illustrated that the threshold of a mode can be delayed by an effective triggering condition, so that if the condition is not verified, the process is maintained in the mode used and if it is verified, the process changes modes. It is clear that such a threshold can be used in the first example of the process. The opposite case is represented by the stages in dashed lines in FIG. 7. As with the determination of the threshold and of the ineffectiveness, the condition for triggering the threshold can be one value and/or one or more events such as soft misses.

Moreover, although the process of the invention has been described with an information system 10 having a hierarchy of memories with only two levels, the process according to the invention can be used with a larger number of levels. The preceding description makes it quite clear that the memory 13 could also be included as a cache memory in an intermediate level of cache memories associated with a lower level bulk memory. In a first example of implementation of the invention, the hierarchy of memories with N levels can be divided into two adjacent parts, with the high part providing the indications (events, values, or states of the bits U and the code C) for determining the ineffectiveness of each mode, and the low part deciding which mode to use based on these indications. In the example in FIG. 1, the decision would be made in the memory 13. In another example, the hierarchy is divided into branches or into groups of branches, and the decision could be assigned to the branches or groups of branches. Thus, the copies in one or more branches could be managed in an appropriate mode, which could be different from that used in others. The combination of this example with the first would give the initiative for the decision to the cache memory which would have the highest level in the low part. In a third example, the decision is made by each of the cache memories, or by one or more predetermined cache memories. For example, in a system in which the acknowledgements return directly to the cache memory requesting an update, or in which it is assured that this has happened, the low memory such as 13 would no longer see the passage of these acknowledgements, and therefore of the utility bits, and this cache memory would therefore be capable of taking the initiative for the decision of which mode to use. One possibility is to transfer the decision to the low memory so that this memory, if it knows where all the copies are, can implement it, as in the so-called "directory based" system. In a system in which the low memory does not know where the copies are, for example the so-called "broadcast" system in a bus, or in a system using what is known as the "snoopy" mode, all the cache memories see the utility bits pass and can thus decide on the mode. These examples make it clear, in a general way, that the decision as to which mode to use for managing the copies of each memory block can either be centralized at one or more points in the hierarchy of memories, with each point being able to be predetermined, such as the memory 13, or even being the emitter of the last update, or it can be made by the memories 12, 13 simultaneously and identically in a distributed way.

What is claimed is:

1. A process for coherency in memories of an information system, the process comprising using as a first mode an update mode or an invalidation mode for copies of a memory block, determining a first threshold representative of the ineffectiveness of said first mode, switching from said first mode to the other and second mode when said first threshold is met, determining a second threshold representative of the ineffectiveness of said second mode, switching from said second mode to said first mode when said second threshold is met, said switching step from the first and/or second mode being delayed by an effective triggering condition which, if not verified, maintains the process in the mode used.

2. The process according to claim 1, further comprising, when the invalidation mode is used, distinguishing, for misses to read a memory, between hard misses, which correspond to the absence of a sought copy of said memory block, and soft misses, which mean that the copy being searched for is present but that said copy searched for has been invalidated, and considering the soft misses as criteria for said ineffectiveness of the invalidation mode and/or for said triggering condition.

3. The process according to claim 1, further comprising incorporating into at least one copy of the memory block at least one code bit which represents said at least one of the modes and the corresponding delayed mode.

4. The process according to claim 1, further comprising using said process for a snooping coherency.

5. The process according to claim 1, further comprising using said process for a directory-based coherency.

6. An information system having memories and means for coherency in said memories, the coherency means comprising means for using a first mode selected between an update mode and an invalidation mode for copies of a memory block, means for determining a first threshold representative of the ineffectiveness of said first mode, means for switching from said first mode to the other and second mode when said first threshold is met, means for determining a second threshold representative of the ineffectiveness of said second mode, means for switching from said second mode to said first mode when said second threshold is met, and means for delaying said switching step from the first and/or second mode by an effective triggering condition which, if not verified, maintains the process in the mode used.

7. The system according to claim 6, further comprising, when the invalidation mode is used, means for distinguishing between a hard miss and a soft miss for misses to read a memory, said hard miss corresponding to the absence of a sought copy of said memory block and said soft miss meaning that the copy being searched for is present but that said copy searched for has been invalidated, and means for considering the soft miss as criteria for said ineffectiveness of the invalidation mode and/or for said triggering condition.

8. The system according to claim 6, further comprising means for incorporating into at least one copy of the memory block at least one code bit which represents said at least one of the modes and the corresponding delayed mode.

9. The system according to claim 6, wherein said means for coherency uses a snooping coherency.

10. The system according to claim 6, wherein said means for coherency uses a directory-based coherency.

11. A process for coherency in memories of an information system, comprising using an invalidation mode for a memory block, distinguishing between a hard miss and a soft miss for misses to read a memory, said hard miss corresponding to the absence of a sought copy of said memory block and said soft miss meaning that the copy being searched for is present but that said copy searched for has been invalidated, determining a first threshold representative of the ineffectiveness of said invalidation mode, considering the soft miss as criteria for said ineffectiveness of the invalidation mode and switching from said invalidation mode to an update mode when said first threshold is met.

12. The process according to claim 11, wherein said switching step is delayed by an effective triggering condition which, if not verified, maintains the process in the mode used.

13. The process according to claim 12, wherein said soft miss are also considered as criteria for said triggering condition.

14. The process according to claim 11, further including using said process for a snooping coherency.

15. The process according to claim 11, further including using said process for a directory-based coherency.

16. An information system having memories and means for coherency in said memories, said coherency means comprising means for using an invalidation mode for a memory block, means for distinguishing between a hard miss and a soft miss for misses to read a memory, said hard miss corresponding to the absence of a sought copy of said memory block and said soft miss meaning that the copy being searched for is present but that said copy searched for has been invalidated, means for determining a first threshold representative of the ineffectiveness of said invalidation mode, means for considering the soft miss as criteria for said ineffectiveness of the invalidation mode and means for switching from said invalidation mode to an update mode when said first threshold is met.

17. The system according to claim 16, further comprising means for delaying said switching step by an effective triggering condition which, if not verified, maintains the process in the mode used.

18. The system according to claim 17, further comprising means for considering said soft miss as criteria for said triggering condition.

19. The system according to claim 16, wherein said coherency means uses a snooping coherency.

20. The system according to claim 16, wherein said coherency means uses a directory-based coherency.

* * * * *